United States Patent
Ogawa et al.

(10) Patent No.: US 8,604,130 B2
(45) Date of Patent: *Dec. 10, 2013

(54) ADHESIVE COMPOSITION AND OPTICAL MEMBER USING THE SAME

(75) Inventors: Hiroshi Ogawa, Kanagawa (JP);
Tatsuhiro Suwa, Kanagawa (JP);
Cheong Hun Song, Uiwang (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/176,274

(22) Filed: Jul. 5, 2011

(65) Prior Publication Data

US 2012/0004369 A1 Jan. 5, 2012

(30) Foreign Application Priority Data

Jul. 2, 2010 (JP) ................................. 2010-152122

(51) Int. Cl.
*C08F 8/30* (2006.01)
*C08L 31/00* (2006.01)

(52) U.S. Cl.
USPC ..... 525/100; 525/102; 525/328.8; 525/329.5; 525/329.7; 525/329.9; 525/374; 428/500

(58) Field of Classification Search
None
See application file for complete search history.

(56) References Cited

U.S. PATENT DOCUMENTS

| 7,923,503 | B2 * | 4/2011 | Takahashi et al. | 524/460 |
| 2007/0207312 | A1 | 9/2007 | Ikeya et al. | |
| 2008/0033095 | A1 | 2/2008 | Takahashi et al. | |
| 2008/0138617 | A1 * | 6/2008 | Takahashi et al. | 428/343 |
| 2010/0330354 | A1 * | 12/2010 | Tsukagoshi et al. | 428/220 |
| 2012/0059127 | A1 * | 3/2012 | Ha et al. | 525/327.2 |
| 2012/0108734 | A1 * | 5/2012 | Ogawa et al. | 524/558 |
| 2012/0309873 | A1 * | 12/2012 | Ogawa et al. | 524/106 |
| 2012/0315476 | A1 | 12/2012 | Ogawa et al. | |
| 2012/0316294 | A1 * | 12/2012 | Ogawa et al. | 525/421 |

FOREIGN PATENT DOCUMENTS

| CN | 1665958 | 9/2005 |
| CN | 101117553 | 2/2008 |
| CN | 101298542 | 11/2008 |
| CN | 103087659 A | 5/2013 |
| EP | 1 643 009 A1 | 4/2006 |
| EP | 1829947 A2 | 9/2007 |
| JP | 57-195208 A | 11/1982 |
| JP | 2008-176173 A | 7/2008 |

OTHER PUBLICATIONS

Machine-generated translation into English of JP 2008-176173.*
European Search Report in EP 11172563.6-2109, dated Nov. 4, 2011 (Ogawa, et al.).
Chinese Office Action dated Aug. 22, 2012.
Chinese Office Action dated Jun. 8, 2013.

* cited by examiner

*Primary Examiner* — Marc Zimmer
(74) *Attorney, Agent, or Firm* — Lee & Morse, P.C.

(57) ABSTRACT

An adhesive composition includes a (meth)acrylic copolymer, the (meth)acrylic copolymer containing about 92 to about 99.7 parts by weight of a moiety derived from a (meth)acrylic acid ester monomer, and about 0.3 to about 8 parts by weight of at least one of a moiety derived from a carboxyl group-containing monomer and a moiety derived from a hydroxyl group-containing (meth)acrylic acid monomer, the (meth)acrylic copolymer having a weight average molecular weight of about 500,000 g/mol to about 2,000,000 g/mol, a carbodiimide curing agent, and an oligomeric silane coupling agent.

12 Claims, 6 Drawing Sheets

FIG. 1

TABLE 1

| Equipment | Gel Permeation Chromatography (GPC, Device No. GPC-16) |
|---|---|
| Detector | Differential Refractive Index Detector (RI-8020, Sensitivity: 32, Tosoh Corporation) |
| | UV Absorbance Detector (2487, Wavelength: 215 nm, Sensitivity: 0.2 AUFS, Waters Co., Ltd.) |
| Column | Two TSKgel GMHXL, One G2500HXL<br>(S/N M0052, M0051, N0010, $\phi$7.8 mm×30 cm, Tosoh Corporation) |
| Solvent | Tetrahydrofuran (Wako Junyaku Co., Ltd.) |
| Flow rate | 1.0 ml/min |
| Column temperature | 23°C |
| Sample | Concentration: About 0.2%<br>Dissolving: Smoothly stirred at room temperature<br>Solubility: Dissolved (identified with the naked eye)<br>Filtration: Filtered through a 0.45 μm filter |
| Input | 0.200 ml |
| Reference sample | Monodispersed polystyrene |
| Data processing | GPC data processing system |

FIG. 2

TABLE 2

| Composition | | Ex. 1 | Ex. 2 | Ex. 3 | Ex. 4 | Ex. 5 | Ex. 6 | Ex. 7 |
|---|---|---|---|---|---|---|---|---|
| (meth)acrylic copolymer | BA | 98 | 98 | 98 | 98 | 98 | 98 | 98 |
| | AA | 2 | 2 | 2 | 2 | 2 | 2 | 2 |
| Solid content | % | 28.0 | 18.0 | 15.0 | 13.0 | 30.0 | 18.0 | 18.0 |
| Viscosity | Pa·s | 5.0 | 7.0 | 6.0 | 7.0 | 5.0 | 7.0 | 7.0 |
| Molecular weight | Mw | $6 \times 10^5$ | $12 \times 10^5$ | $16 \times 10^5$ | $18 \times 10^5$ | $6 \times 10^5$ | $12 \times 10^5$ | $12 \times 10^5$ |
| Isocyanate curing agent | C-L | 1.5 | 0.50 | 0.5 | 0.3 | 0.3 | 0.3 | - |
| Carbodi-imide curing agent | V-07 | 0.3 | 0.15 | - | - | - | - | 0.20 |
| | V-05 | - | - | 0.1 | 0.05 | 0.5 | 0.20 | - |
| | V-01 | - | - | - | - | - | - | - |
| Oligomeric silane coupling agent | #1053 | 0.3 | 0.1 | 0.05 | 0.05 | - | - | 0.3 |
| | #1810 | - | - | - | - | 0.3 | 0.15 | - |
| Aziridine | TAZM | - | - | - | - | - | - | - |
| Monomeric silane coupling agent | KBM-403 | - | - | - | - | - | - | - |
| Durability | Heat resistance | O | O | O | O | O | O | O |
| | Humid heat resistance | O | O | O | O | O | O | O |
| | Light leakage | O | Δ | Δ | O | O | Δ | Δ |
| Adhesive strength | N/25 mm | 3.5 | 3.0 | 2.8 | 2.5 | 3.3 | 3.0 | 2.5 |
| | state | O | O | O | O | O | O | O |

FIG. 3

TABLE 3

| Composition | | Ex. 8 | Ex. 9 | Ex. 10 | Ex. 11 | Ex. 12 | Ex. 13 | Ex. 14 |
|---|---|---|---|---|---|---|---|---|
| (meth)acrylic copolymer | BA | 98 | 96 | 89 | 99 | 90 | 96 | 98 |
| | MA | - | - | 10 | - | 6 | - | - |
| | AA | 2 | 4 | 1 | - | - | 4 | 2 |
| | 2HEA | - | - | - | 1 | 4 | - | - |
| Solid content | % | 18.0 | 14.5 | 14.7 | 18.8 | 17.5 | 17.6 | 18.0 |
| Viscosity | Pa·s | 7.0 | 7.0 | 5.0 | 8.0 | 8.0 | 8.0 | 7.0 |
| Molecular weight | Mw | $12 \times 10^5$ | $16 \times 10^5$ | $16 \times 10^5$ | $12 \times 10^5$ | $13 \times 10^5$ | $12 \times 10^5$ | $12 \times 10^5$ |
| Isocyanate curing agent | C-L | - | 0.3 | 0.3 | - | 0.1 | 2.5 | 4 |
| Carbodiimide curing agent | V-07 | 0.20 | - | - | - | - | - | - |
| | V-05 | - | 0.5 | 0.1 | - | - | 0.02 | 0.02 |
| | V-01 | - | - | - | 0.8 | 0.1 | - | - |
| Oligomeric silane coupling agent | #1053 | 0.6 | 0.1 | - | - | 0.2 | 0.8 | 0.8 |
| | #1810 | - | - | 0.1 | 0.2 | - | - | - |
| Aziridine | TAZM | - | - | - | - | - | - | - |
| Monomeric silane coupling agent | KBM-403 | - | - | - | - | - | - | - |
| Durability | Heat resistance | O | O | O | O | O | O | O |
| | Humid heat resistance | O | O | O | O | O | O | Δ |
| | Light leakage | Δ | O | Δ | O | Δ | O | O |
| Adhesive strength | N/25 mm | 2.0 | 4.5 | 3.3 | 2.8 | 2.3 | 2.8 | 2.3 |
| | state | O | O | O | O | O | O | O |

FIG. 4

TABLE 4

| Composition | | Ex. 15 | Ex. 16 | Ex. 17 | Ex. 18 |
|---|---|---|---|---|---|
| (meth)acrylic copolymer | BA | 97.9 | 97.8 | 97.9 | 97.9 |
| | AA | 2 | 2 | 2 | 2 |
| | 2HEA | 0.1 | 0.2 | 0.1 | 0.1 |
| Solid content | % | 18.1 | 18.2 | 23.0 | 22.8 |
| Viscosity | Pa·s | 7.0 | 7.5 | 8.0 | 2.8 |
| Molecular weight | Mw | $12.5 \times 10^5$ | $12.8 \times 10^5$ | $10 \times 10^5$ | $8 \times 10^5$ |
| Isocyanate curing agent | C-L | 0.4 | 0.3 | 0.4 | 0.5 |
| Carbodiimide curing agent | V-07 | - | 0.18 | 0.25 | 0.30 |
| | V-05 | 0.18 | - | - | - |
| | V-01 | - | - | - | - |
| Oligomeric silane coupling agent | #1053 | 0.15 | 0.15 | 0.25 | - |
| | #1810 | - | - | - | 0.3 |
| Aziridine | TAZM | - | - | - | - |
| Monomeric silane coupling agent | KBM-403 | - | - | - | - |
| Durability | Heat resistance | O | O | O | O |
| | Humid heat resistance | O | O | O | O |
| | Light leakage | Δ | Δ | O | O |
| Adhesive strength | N/25 mm | 3.2 | 3.2 | 3.4 | 3.5 |
| | state | O | O | O | O |

FIG. 5

TABLE 5

| Composition | | Comparative Example | | | | | |
|---|---|---|---|---|---|---|---|
| | | 1 | 2 | 3 | 4 | 5 | 6 |
| (meth)acrylic copolymer | BA | 98 | 98 | 98 | 98 | 98 | 96 |
| | AA | 2 | 2 | 2 | 2 | 2 | 4 |
| Solid content | % | 28.0 | 18.0 | 15.0 | 18.0 | 18.0 | 14.5 |
| Viscosity | Pa·s | 5.0 | 7.0 | 6.0 | 7.0 | 7.0 | 7.0 |
| Molecular weight | Mw | $6 \times 10^5$ | $12 \times 10^5$ | $16 \times 10^5$ | $12 \times 10^5$ | $12 \times 10^5$ | $16 \times 10^5$ |
| Isocyanate curing agent | C-L | 1.5 | 0.50 | 0.5 | 0.5 | 1.5 | 0.5 |
| Carbodiimide curing agent | V-07 | - | - | - | - | - | 0.15 |
| | V-05 | - | - | 0.15 | 1.5 | 0.008 | - |
| | V-01 | - | - | - | - | - | - |
| Oligomeric silane coupling agent | #1053 | 0.3 | 0.1 | - | 0.1 | 0.1 | 2.0 |
| | #1810 | - | - | - | - | - | - |
| Aziridine | TAZM | 0.04 | 0.03 | - | - | - | - |
| Monomeric silane coupling agent | KBM-403 | - | - | 0.1 | - | - | - |
| Durability | Heat resistance | x | x | O | x | x | x |
| | Humid heat resistance | x | x | O | x | x | x |
| | Light leakage | x | x | O | x | x | x |
| Adhesive strength | N/25 mm | 6.0 | 5.0 | 7.0 | 1.5 | 4.5 | 1.0 |
| | state | O | O | O | O | O | O |

FIG. 6

TABLE 6

| Composition | | Comp. Ex. 7 | Comp. Ex. 8 | Comp. Ex. 9 | Comp. Ex. 10 |
|---|---|---|---|---|---|
| (meth)acrylic copolymer | BA | 98 | 98 | 99 | 98 |
| | AA | 2 | 2 | - | 2 |
| | 2HEA | - | - | 1 | - |
| Solid content | % | 18.0 | 18.0 | 18.8 | 18.0 |
| Viscosity | Pa·s | 7.0 | 7.0 | 8.0 | 7.0 |
| Molecular weight | Mw | $12 \times 10^5$ | $12 \times 10^5$ | $12 \times 10^5$ | $12 \times 10^5$ |
| Isocyanate curing agent | C-L | 2.0 | 0.5 | - | 2.5 |
| Carbodiimide curing agent | V-07 | - | - | - | 0.005 |
| | V-05 | - | 1.0 | - | - |
| | V-01 | - | - | 0.8 | - |
| Oligomeric silane coupling agent | #1053 | - | - | 1.5 | 1.5 |
| | #1810 | 0.1 | - | - | - |
| Aziridine | TAZM | - | - | - | - |
| Monomeric silane coupling agent | KBM-403 | - | - | - | - |
| Durability | Heat resistance | x | O | x | x |
| | Humid heat resistance | O | x | x | x |
| | Light leakage | x | O | x | x |
| Adhesive strength | N/25 mm | 3.5 | 5.0 | 1.2 | 1.5 |
| | state | O | O | O | O |

ADHESIVE COMPOSITION AND OPTICAL MEMBER USING THE SAME

FIELD

Embodiments relate to an adhesive composition and an optical member using the same.

DESCRIPTION OF RELATED ART

Image display apparatuses, such as a liquid crystal display (LCD) and a plasma display panel (PDP), are becoming lighter and larger scale. As display apparatuses become larger scale, adhesives used for manufacture of display apparatuses are also required to have improved and novel properties. For example, an LCD panel is manufactured by sequentially stacking an LCD panel, a polarizer plate, a protective film, and the like with adhesive layers interposed therebetween.

SUMMARY

An embodiment is directed to an adhesive composition, including a (meth)acrylic copolymer, the (meth)acrylic copolymer containing about 92 to about 99.7 parts by weight of a moiety derived from a (meth)acrylic acid ester monomer, and about 0.3 to about 8 parts by weight of at least one of a moiety derived from a carboxyl group-containing monomer and a moiety derived from a hydroxyl group-containing (meth)acrylic acid monomer, the (meth)acrylic copolymer having a weight average molecular weight of about 500,000 g/mol to about 2,000,000 g/mol, a carbodiimide curing agent, and an oligomeric silane coupling agent.

The adhesive composition may include about 100 parts by weight of the (meth)acrylic copolymer, about 0.01 to about 1.0 part by weight of the carbodiimide curing agent, and about 0.02 to about 1.0 part by weight of the oligomeric silane coupling agent.

The adhesive composition may further include an isocyanate curing agent.

The isocyanate curing agent may be present in an amount of about 0.05 to about 5 parts by weight, based on 100 parts by weight of the (meth)acrylic copolymer.

The (meth)acrylic copolymer may have a weight average molecular weight of about 600,000 g/mol to about 1,800,000 g/mol.

The oligomeric silane coupling agent may have an organic functional group.

The adhesive composition may have an adhesive strength of about 0.5 to about 5.0 N/25 mm at a peeling angle of 90 degrees and at a peeling rate of 0.3 m/min.

The organic functional group may be at least one of a vinyl group, an epoxy group, a styryl group, a (meth)acryloyl, a methacryloxy group, an acryloxy group, an amino group, a ureido group, a chloropropyl group, a mercapto group, and a polysulfide group.

The (meth)acrylic acid ester monomer may not have a hydroxyl group, and may be selected from methyl (meth)acrylate, ethyl (meth)acrylate, n-butyl (meth)acrylate, 2-ethylhexyl (meth)acrylate, and combinations thereof.

The (meth)acrylic copolymer may include the moiety derived from a carboxyl group-containing monomer, and the carboxyl group-containing monomer may be selected from (meth)acrylic acid, maleic acid, maleic anhydride, fumaric acid, fumaric anhydride, crotonic acid, itaconic acid, itaconic anhydride, and combinations thereof.

The (meth)acrylic copolymer may include the moiety derived from a hydroxyl group-containing (meth)acrylic acid monomer, and the hydroxyl group-containing (meth)acrylic acid monomer may be selected from 2-hydroxyethyl (meth)acrylate, 4-hydroxybutyl (meth)acrylate, 2-hydroxyethyl (meth)acrylamide, cyclohexane dimethanol monoacrylate, and combinations thereof.

Another embodiment is directed to an optical member including an adhesive layer formed of the adhesive composition according to an embodiment.

BRIEF DESCRIPTION OF THE DRAWINGS

The above and other features and advantages will become more apparent to those of skill in the art by describing in detail example embodiments with reference to the attached drawings, in which:

FIGS. 1-6 illustrate Tables 1-6, respectively.

DETAILED DESCRIPTION

Japanese Patent Application No. 2010-152122, filed on Jul. 2, 2010, in the Japan Patent Office, and entitled: "Adhesive Composition and Optical Member Using the Same," is incorporated by reference herein in its entirety.

Example embodiments will now be described more fully hereinafter with reference to the accompanying drawings; however, they may be embodied in different forms and should not be construed as limited to the example embodiments set forth herein. Rather, these example embodiments are provided so that this disclosure will be thorough and complete, and will fully convey the scope of the invention to those skilled in the art.

Herein, the term "(meth)acrylate" collectively refers to both acrylate and methacrylate. Further, (meth) compound will collectively refer to both a compound and a (meth)-containing compound. For example, "(meth)acrylic acid" includes both acrylic acid and methacrylic acid.

An embodiment provides an adhesive composition. The adhesive composition may include an acrylic copolymer, a carbodiimide curing agent, and an oligomeric silane coupling agent in a specific ratio. Hereinafter, components of an adhesive composition according to an example embodiment will be described in detail.

[(Meth)acrylic Copolymer]

A (meth)acrylic copolymer is a main component of the adhesive composition according to the present example embodiment and will form an adhesive layer. The (meth)acrylic copolymer may be a reaction product of a (meth)acrylic acid ester monomer (a-1) and one or more of a carboxyl group-containing monomer (a-2) and a hydroxyl group-containing (meth)acrylic acid monomer (a-3). The (meth)acrylic copolymer may be used alone or in a mixture of two or more copolymers.

In an implementation, the (meth)acrylic copolymer includes about 92 to about 99.7 parts by weight of a moiety derived from a (meth)acrylic acid ester monomer, and about 0.3 to about 8 parts by weight of at least one of a moiety derived from a carboxyl group-containing monomer and a moiety derived from a hydroxyl group-containing (meth)acrylic acid monomer, and has a weight average molecular weight of about 500,000 g/mol to about 2,000,000 g/mol. In another implementation, the (meth)acrylic copolymer consists of about 92 to about 99.7 parts by weight of the moiety derived from a (meth)acrylic acid ester monomer, and about 0.3 to about 8 parts by weight of at least one of the moiety derived from a carboxyl group-containing monomer and the moiety derived from a hydroxyl group-containing (meth)acrylic acid monomer.

(a-1) (Meth)acrylic Acid Ester Monomer

The (meth)acrylic acid ester monomer (hereinafter, also referred to as "component (a-1)") is an ester of (meth)acrylic acid having no hydroxyl group. Examples of the (meth) acrylic acid ester monomer may include methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, isoamyl (meth)acrylate, n-hexyl (meth)acrylate, n-heptyl (meth)acrylate, n-octyl (meth)acrylate, tert-octyl (meth)acrylate, 2-ethylhexyl (meth)acrylate, decyl (meth)acrylate, isodecyl (meth)acrylate, tridecyl (meth)acrylate, stearyl (meth)acrylate, isostearyl (meth)acrylate, phenyl (meth)acrylate, benzyl (meth)acrylate, dodecyl (meth)acrylate, tetrahydrofurfuryl (meth)acrylate, cyclohexyl (meth)acrylate, 4-n-butylcyclohexyl (meth)acrylate, 2-ethylhexyl diglycol (meth)acrylate, butoxyethyl (meth)acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, 4-butylphenyl (meth)acrylate, phenyl (meth)acrylate, 2,4,5-tetramethyl phenyl (meth)acrylate, phenoxymethyl (meth)acrylate, phenoxyethyl (meth)acrylate, polyethylene oxide monoalkyl ether (meth)acrylate, polypropylene oxide monoalkyl ether (meth)acrylate, trifluoroethyl (meth)acrylate, pentadecafluorooxyethyl (meth)acrylate, 2-chloroethyl (meth)acrylate, 2,3-dibromopropyl (meth)acrylate, tribromophenyl (meth)acrylate, etc. These (meth)acrylic acid ester monomers may be used alone or in a combination thereof.

Among these monomers, methyl (meth)acrylate, ethyl (meth)acrylate, n-butyl (meth)acrylate, and 2-ethylhexyl (meth)acrylate are preferable; and methyl (meth)acrylate, n-butyl(meth)acrylate, and 2-ethylhexyl (meth)acrylate are more preferable.

The (meth)acrylic acid ester monomer may be included in an amount of about 92 to about 99.7 parts by weight, preferably about 94 to about 99.5 parts by weight, and more preferably about 96 to about 99 parts by weight, based on about 100 parts by weight of the total amount of the monomer (a-1) and monomers (a-2) and/or (a-3) (i.e., based on the total amount of the monomer (a-1), the monomer (a-2), and the monomer (a-3) when all three are included, or based on the total amount of the monomer (a-1) and the monomer (a-2) when monomer (a-3) is not included, etc.).

(a-2) Carboxyl Group-containing Monomer

The carboxyl group-containing monomer (hereinafter, also referred to as "component (a-2)") is an unsaturated monomer having at least one carboxyl group. Examples of the carboxyl group-containing monomer may include (meth)acrylic acid, maleic acid, maleic anhydride, fumaric acid, fumaric anhydride, crotonic acid, itaconic acid, itaconic anhydride, myristic acid, palmitic acid, oleic acid, etc. These monomers may be used alone or in a combination thereof.

Among these monomers, (meth)acrylic acid, maleic acid, maleic anhydride, fumaric acid, fumaric anhydride, crotonic acid, itaconic acid, and itaconic anhydride are preferable; and (meth)acrylic acid is more preferable.

(a-3) Hydroxyl Group-containing (meth)acrylic Acid Monomer

The hydroxyl group-containing (meth)acrylic acid monomer (hereinafter, also referred to as "component (a-3)") is an acrylic monomer having a hydroxyl group. Examples of the hydroxyl group-containing (meth)acrylic acid monomer may include 2-hydroxyethyl (meth)acrylate, 4-hydroxybutyl (meth)acrylate, 1,6-hexanediol mono(meth)acrylate, pentaerythritol tri(meth)acrylate, dipentaerythritol penta(meth)acrylate, neopentylglycol mono(meth)acrylate, trimethylolpropane di(meth)acrylate, trimethylolethane di(meth)acrylate, 2-hydroxypropyl (meth)acrylate, 2-hydroxybutyl (meth)acrylate, 2-hydroxy-3-phenyloxypropyl (meth)acrylate, 4-hydroxycyclohexyl (meth)acrylate, N-2-hydroxyethyl (meth)acrylamide, cyclohexane dimethanol monoacrylate, etc. Further, the hydroxyl group-containing (meth)acrylic acid monomer may include compounds obtained by addition reaction of a glycidyl group-containing compound, such as alkyl glycidyl ether, allyl glycidyl ether, and glycidyl (meth)acrylate, with (meth)acrylic acid. These hydroxyl group-containing (meth)acrylic acid monomers may be used alone or in a combination thereof.

Among these monomers, 2-hydroxyethyl (meth)acrylate, 4-hydroxybutyl (meth)acrylate, 2-hydroxyethyl (meth)acrylamide, and cyclohexane dimethanol monoacrylate are preferable; and 2-hydroxyethyl (meth)acrylate, 4-hydroxybutyl (meth)acrylate, and N-2-hydroxyethyl (meth)acrylamide are more preferable.

The at least one of the carboxyl group-containing monomer and the hydroxyl group-containing (meth)acryl monomer may be included in an amount of about 0.3 to about 8 parts by weight, based on about 100 parts by weight of the total amount of the monomer (a-1) and monomers (a-2) and/or (a-3). The at least one of the carboxyl group-containing monomer and the hydroxyl group-containing (meth)acryl monomer is preferably present in an amount of about 0.5 to about 6 parts by weight, and more preferably about 1 to about 4 parts by weight. Maintaining the amount of hydroxyl group-containing (meth)acryl monomer exceeds at about 8 parts by weight or less helps ensure that the acrylic copolymer does not contain an excess of hydroxyl groups or carboxyl groups, such that excess crosslinking points are not formed by reaction of the hydroxyl group or carboxyl group and the carbodiimide curing agent, which could deteriorate flexibility of the adhesive composition and durability of an adhesive layer. Maintaining the amount at about 0.3 parts by weight or more helps ensure that the number of crosslinking points is not decreased, which could make it difficult to realize heat resistance.

The (meth)acrylic copolymer may be prepared by any suitable method such that the monomers react to form the corresponding moieties in the copolymer, e.g., solution polymerization, emulsion polymerization, suspension polymerization, reverse-phase suspension polymerization, thin-film polymerization, and spray polymerization, which use a polymerization initiator. Polymerization control may be conducted by thermal insulation polymerization, temperature control polymerization, and isothermal polymerization. In addition to a method of using a polymerization initiator to initiate polymerization, irradiation, electromagnetic radiation, and UV radiation may be used to initiate polymerization. Among these methods, solution polymerization using a polymerization initiator may be used so that molecular weight is easily adjusted and impurities may be decreased. For example, the (meth)acrylic copolymer may be produced by adding about 0.01 to about 0.5 parts by weight of a polymerization initiator to about 100 parts by weight of the total amount of the monomers using ethyl acetate, toluene, or methyl ethyl ketone as a solvent, followed by reaction under nitrogen atmosphere at about 60 to about 90° C. for about 3 to about 10 hours. Examples of the polymerization initiator may include: azo compounds, such as azobisisobutyronitrile (AIBN), 2-2'-azobis(2-methylbutyronitrile), and azobiscyanovaleric acid; organic peroxides, such as tert-butyl peroxypivalate, tert-butyl peroxybenzoate, tert-butyl peroxy-2-ethylhexanoate, di-tert-butyl peroxide, cumene hydroperoxide, benzoyl peroxide, and tert-butyl hydroperoxide; and inorganic peroxides, such as hydrogen peroxide, ammonium persulfate, potassium persulfate, and sodium persulfate. These initiators may be used alone or in a combination thereof.

(Other Monomers)

If desired, the copolymer may further include other monomers copolymerizable with the monomers (a-1) to (a-3). Examples of the other monomers may include: an epoxy group-containing acrylic monomer, such as glycidyl (meth)acrylate and methyl glycidyl (meth)acrylate; an amino group-containing acrylic monomer, such as dimethylaminoethyl (meth)acrylate, diethylaminoethyl (meth)acrylate, N-tert-butylaminoethyl (meth)acrylate, and methacryloxyethyl trimethylammonium chloride (meth)acrylate; an amide group-containing acrylic monomer, such as (meth)acrylamide, N-methylol (meth)acrylamide, N-methoxymethyl (meth)acrylamide, and N,N-methylene bis(meth)acrylamide; a phosphate group-containing acrylic monomer, such as 2-methacryloyloxyethyl diphenyl phosphate (meth)acrylate, trimethacryloyloxyethyl phosphate (meth)acrylate, and triacryloyloxyethyl phosphate (meth)acrylate; a sulfonic acid group-containing acrylic monomer, such as sodium sulfopropyl (meth)acrylate, sodium-2-sulfoethyl (meth)acrylate, and sodium-2-acrylamid-2-methylpropane sulfonate; a urethane group-containing acrylic monomer, such as urethane (meth)acrylate; a phenyl group-containing acrylic vinyl monomer, such as p-tert-butylphenyl (meth)acrylate and o-biphenyl (meth)acrylate; a silane group-containing vinyl monomer, such as 2-acetoacetoxyethyl (meth)acrylate, vinyltrimethoxysilane, vinyltriethoxysilane, vinyl tris(β-methoxyethyl)silane, vinyl triacetylsilane, and methacryloyloxypropyltrimethoxysilane; and styrene, chlorostyrene, α-methylstyrene, vinyltoluene, vinyl chloride, vinyl acetate, vinyl propionate, acrylonitrile, and vinyl pyridine; etc. These monomers may be used alone or in a combination thereof.

Among these monomers, (meth)acrylamide, glycidyl (meth)acrylate, dimethylaminoethyl (meth)acrylate, and 2-acetoacetoxyethyl (meth)acrylate are preferable; and (meth)acrylamide, dimethylaminoethyl (meth)acrylate, and 2-acetoacetoxyethyl (meth)acrylate are more preferable.

The other monomers may be included in an amount of about 0.1 to about 15 parts by weight, preferably about 0.2 to about 10 parts by weight, and more preferably about 0.3 to about 5 parts by weight, based on about 100 parts by weight of the total amount of the monomer (a-1) and monomers (a-2) and/or (a-3).

The (meth)acrylic copolymer prepared by copolymerization of the above monomers may have a weight average molecular weight Mw of about 500,000 g/mol to about 2,000,000 g/mol, preferably about 600,000 g/mol to about 1,800,000 g/mol, and more preferably about 1,200,000 g/mol to about 1,600,000 g/mol. Maintaining the weight average molecular weight at about 500,000 g/mol or more helps ensure sufficient heat resistance is obtained. Maintaining the weight average molecular weight at about 2,000,000 g/mol or less helps ensure that sufficiently high tack is obtained, avoiding a decrease in adhesion. In the present example embodiment, the weight average molecular weight is based on a polystyrene standard measured by the method stated in the following examples.

In the present embodiment, a (meth)acrylic copolymer having a weight average molecular weight of about 600,000 g/mol to about 1,300,000 g/mol may be used, which is lower than copolymers in the art. With this composition, it is possible to increase the solid content in an adhesive composition liquid, thereby improving productivity of products including an adhesive layer formed using the adhesive composition.

[Carbodiimide Curing Agent]

The adhesive composition may include a carbodiimide curing agent. The carbodiimide curing agent reacts with and is coupled to a hydroxyl group and/or a carboxyl group of the (meth)acrylic copolymer, thereby forming a cross-linked structure. As a polarizer plate may deform through expansion or contraction due to change of surroundings such as ambient temperature or the like, an adhesive layer using the adhesive composition according to an embodiment may accommodate expansion/contraction of the polarizer plate while preventing peeling or separation of the polarizer plate and foaming of the adhesive layer when exposed to the change of surroundings.

Without being bound by theory, it is believe that crosslinking points caused by the carbodiimide curing agent are linearly arranged on straight-chain molecules of carbodiimide to form a highly flexible cross-linked structure, thereby distributing stress instead of being concentrated in the adhesive layer during expansion or contraction (e.g., expansion or contraction of a polarizer plate). In this manner, since the carbodiimide curing agent provides a highly flexible cross-linked structure, the adhesive composition according to embodiments may use a (meth)acrylate copolymer having a relative low molecular weight, and may prevent peeling or separation of the polarizer plate and foaming of the adhesive layer even when the degree of crosslinking is increased by increasing the amount of carbodiimide curing agent added.

The carbodiimide curing agent may include any suitable carbodiimide curing agent. For example, a compound having at least two carbodiimide groups (—N=C=N—) may be used, and any suitable polycarbodiimide may be used. A diisocyanate compound including at least two carbodiimide groups is preferably used.

The carbodiimide compound may include high molecular weight polycarbodiimide prepared by a decarbonation condensation reaction of diisocyanate in the presence of a carbodiimide catalyst. Examples of the compound may include compounds obtained by decarbonation condensation reaction of the following diisocyanates.

The diisocyanates include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenylether diisocyanate, 3,3'-dimethyl-4,4'-diphenylether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethyl xylene diisocyanate, which may be used alone or in a combination thereof.

The carbodiimide catalyst may include phospholene oxides, such as 1-phenyl-2-phospholene-1-oxide, 3-methyl-2-phospholene-1-oxide, 1-ethyl-3-methyl-2-phospholene-1-oxide, 1-ethyl-2-phospholene-1-oxide, 3-phospholene, and isomers thereof.

In addition, these high-molecular weight polycarbodiimides may be obtained by synthesis or from commercially available products. Commercially available products of the component may include CARBODILITE® (Nisshinbo Chemical Inc.), specifically CARBODILITE® V-01, V-03, V-05, V-07 and V09, which have excellent compatibility with organic solvents. Preferably, it is selected from CARBODILITE® V-01, V-05, and V-07.

The carbodiimide curing agent may be present in an amount of about 0.01 to about 1.0 parts by weight, based on about 100 parts by weight of the (meth)acrylic copolymer. Within this range, a proper cross-linked structure is formed, thereby realizing excellent durability. Maintaining the amount of carbodiimide curing agent at about 0.01 parts by weight or more helps ensure that sufficient cross-linking is formed, thereby ensuring durability. Maintaining the amount of carbodiimide curing agent at about 1.0 parts by weight or less helps ensure that a cross-linking reaction is not excessively performed, which could result in an inability to accommodate contraction of a polarizer plate over time and thereby reduce durability. The amount of carbodiimide curing agent may be about 0.02 to about 0.8 parts by weight, preferably about 0.10 to about 0.20 parts by weight.

[Oligomeric Silane Coupling Agent]

The adhesive composition preferably includes a silane coupling agent, e.g., an oligomeric silane coupling agent. The oligomeric silane coupling agent may be prepared by condensation of two or more silane compounds, each of which has at least one alkoxy group, to form a —Si—O—Si— structure. As a result of condensation, a —Si—O—Si— structure is formed in which at least one alkoxy group is bonded to one of the silicon atoms. The oligomeric silane coupling agent may have an organic functional group.

The use of the oligomeric silane coupling agent helps achieve low tack of an adhesive layer to be formed using the adhesive composition. The presence of an alkoxy group helps the oligomeric silane coupling agent exhibit good adhesion to glass (a material used in display members such as liquid crystal panels). In addition, the organic functional group helps the oligomeric silane coupling agent to have high compatibility with, and adhesion to, the (meth)acrylic copolymer, and to exhibit an "anchor" effect on the (meth)acrylic copolymer. The siloxane skeleton constituting the oligomer may exhibits some extent of fluidity (plasticity). Thus, an adhesive layer to be formed may exhibit low tack. Also, the oligomeric silane coupling agent may migrate so as to be placed on the surface of the adhesive layer because of poor compatibility of the siloxane skeleton with the (meth)acrylic copolymer. As a result of this migration, the siloxane skeleton may be adhered to glass to which the alkoxy group is bound, and the organic functional group may exhibit an anchor effect on the (meth) acrylic copolymer. On the other hand, stress tends to be concentrated at the interface between a glass substrate and the adhesive layer due to plasticity of the siloxane skeleton, facilitating peeling of the glass substrate from the adhesive layer. Without being bound by theory, it is believed that this easy peeling is correlated with low tack of the adhesive layer. Thus, suitably selecting the kind of the organic functional group and the length of the siloxane skeleton, i.e. the degree of polymerization of the oligomer, depending on the intended degree of tack of the adhesive layer may be an important consideration.

A criterion for low tack of the adhesive layer is an adhesive strength of about 5.0 N/25 mm or less. In a laminate of a liquid crystal panel and an optical film (whose sizes have been increased in recent years) through the adhesive layer having an adhesive strength of about 5.0 N/25 mm or less, it is easy to separate the liquid crystal panel and the optical film from each other in a subsequent process, which should help improve workability and productivity. In an example embodiment, there is no particular restriction as to the lower limit of the adhesive strength, considering that, taking into account the function of the adhesive composition as an adhesive, the lower limit of the adhesive strength is preferably about 0.5 N/25 mm or more. The adhesive strength of the adhesive layer is preferably from about 0.5 to about 5.0 N/25 mm, more preferably from about 0.15 to about 4.8 N/25 mm. The adhesive strength of the adhesive layer is measured pursuant to the JIS Z0237 (2000) testing method for adhesive tapes/adhesive sheets. More specifically, the adhesive strength of the adhesive layer is measured by a method described in the Examples Section that follows.

Examples of organic functional groups that can be included in the oligomeric silane coupling agent include vinyl, epoxy, styryl, (meth)acryloyl, methacryloxy, acryloxy, amino, ureido, chloropropyl, mercapto, and polysulfide groups. Of these, epoxy, mercapto, and (meth)acryloyl groups are preferred to simultaneously attain improved durability and low tack of an adhesive layer to be formed. Epoxy and mercapto groups are particularly preferred.

The oligomeric silane coupling agent may be one that has two silicon atoms or more in one molecule. In an example embodiment, the oligomeric silane coupling agent may have a weight average molecular weight of more than about 200 g/mol and less than about 10,000 g/mol. In another example embodiment, the oligomeric silane coupling agent may have an upper weight average molecular weight equal to 10,000 g/mol The oligomeric silane coupling agent may be one that has two silicon atoms (i.e. a dimer) to about 100 silicon atoms in one molecule, and may have an average degree of polymerization of about 2 to about 100. Generally, the oligomeric silane coupling agent may become more viscous with increasing average degree of polymerization. It is possible that an oligomeric silane coupling agent having an average degree of polymerization higher than about 100 may be in the form of a paste or solid, which may be difficult to handle on account of its high viscosity. Therefore, the average degree of polymerization of the oligomeric silane coupling agent is preferably about 2 to about 80, and more preferably about 3 to about 50.

The organic functional group included in the oligomeric silane coupling agent may be bonded to silicon via an appropriate linker. Examples of such linkers include: alkylene groups, such as methylene, ethylene, trimethylene, hexamethylene, and decamethylene; divalent hydrocarbon groups interrupted by at least one aromatic ring, such as methylphenylethyl; and divalent aliphatic groups interrupted by at least one oxygen atom, such as methoxymethyl, methoxyethyl, and methoxypropyl. When the organic functional group is an epoxy group, a functional group may be formed between the two adjacent carbon atoms that are bonded together to form a ring.

Hereinafter, a description of an example is provided in which the oligomeric silane coupling agent has an epoxy, mercapto, or (meth)acryloyl group as a particularly preferred organic functional group. In the oligomeric silane coupling agent, for example, "an organic group having a mercapto group" is defined as a group in which the mercapto group is bonded to the silicon atom via the linker, "an organic group having an epoxy group" is defined as a group in which the epoxy group is bonded to the silicon atom via the linker, and "an organic group having a (meth)acryloyloxy group" is defined as a group in which the (meth)acryloyloxy group is bonded to the silicon atom via the linker.

Examples of such organic groups having a mercapto group include mercaptomethyl, 3-mercaptopropyl, 6-mercaptohexyl, 10-mercaptodecyl, and 2-(4-mercaptomethylphenyl) ethyl groups. Examples of such organic groups having an epoxy group include glycidoxymethyl, 3-glycidoxypropyl and 2-(3,4-epoxycyclohexyl)ethyl groups. Examples of such organic groups having a (meth)acryloyloxy group include acryloyloxymethyl, 3-acryloyloxypropyl, methacryloyloxymethyl, and 3-methacryloyloxypropyl groups.

The oligomeric silane coupling agent may be a cooligomer obtained by partial co-hydrolysis and polycondensation of a tetraalkoxysilane compound and a silane compound represented by Formula 1:

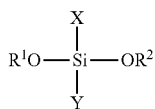 (1)

In Formula 1, $R^1$ and $R^2$ may each independently be an alkyl or phenyl group, X may be an organic group having a functional group selected from mercapto, epoxy, and (meth) acryloyloxy groups, and Y may be an alkyl, alkoxy, phenyl, phenoxy, aralkyl, or aralkyloxy group.

$R^1$ and $R^2$ in Formula 1 may each independently be, for example, a $C_1$-$C_{10}$ alkyl group. It is particularly preferred that $R^1$ and $R^2$ are each independently a methyl or ethyl group.

Specific examples of the organic functional group represented by X are the same as those organic functional groups described previously. Specific examples of organic groups having a mercapto group include mercaptomethyl, 3-mercaptopropyl, 6-mercaptohexyl, 10-mercaptodecyl, and 2-(4-mercaptomethylphenyl)ethyl groups. Specific examples of organic groups having an epoxy group include glycidoxymethyl, 3-glycidoxypropyl, and 2-(3,4-epoxycyclohexyl)ethyl groups. Specific examples of organic groups having a (meth) acryloyloxy group include acryloyloxymethyl, 3-acryloyloxypropyl, methacryloyloxymethyl, and 3-methacryloyloxypropyl groups.

Y in Formula 1 is preferably an alkyl or alkoxy group having 1 to 10 carbon atoms, or an aralkyl or aralkyloxy group having 7 to 10 carbon atoms.

Specific examples of the functional group-containing silane compound represented by Formula 1 are described below. Examples of silane compounds in which X is an organic group having a mercapto group include mercaptomethyltrimethoxysilane, 3-mercaptopropyltrimethoxysilane, 3-mercaptopropyltriethoxysilane, 2-(4-mercaptomethylphenyl)ethyltrimethoxysilane, 6-mercaptohexyltrimethoxysilane, 10-mercaptodecyltrimethoxysilane, 3-mercaptopropylmethyldimethoxysilane and 3-mercaptopropylmethyldiethoxysilane.

Examples of silane compounds in which X is an organic group having an epoxy group include glycidoxymethyltrimethoxysilane, 3-glycidoxypropyltrimethoxysilane, 2-(3,4-epoxycyclohexyl)ethyltrimethoxysilane, and 3-glycidoxypropylmethyldimethoxysilane.

Examples of silane compounds in which X is an organic group having a (meth)acryloyloxy group include acryloyloxymethyltrimethoxysilane, 3-acryloyloxypropyltrimethoxysilane, 3-acryloyloxypropyltriethoxysilane, methacryloyloxymethyltrimethoxysilane, 3-methacryloyloxypropyltrimethoxysilane, 3-methacryloyloxypropyltriethoxysilane, 3-methacryloyloxypropyltributoxysilane, 3-acryloyloxypropylmethyldimethoxysilane, 3-methacryloyloxypropylmethyldimethoxysilane, and 3-methacryloyloxypropylmethyldiethoxysilane.

The tetraalkoxysilane, which may be partially co-hydrolyzed and polycondensed with the functional group-containing silane compound represented by Formula 1, have four alkoxy groups bonded to the silicon atom. Each of the alkoxy groups preferably has 1 to 10 carbon atoms. The four alkoxy groups bonded to the silicon atom may be the same or different. It is preferred, in terms of ease of production and purchase, that the same alkoxy groups are bonded to the silicon atom. Specific examples of such silane compounds include tetramethoxysilane, tetraethoxysilane, tetrapropoxysilane, and tetrabutoxysilane.

The oligomeric silane coupling agent may be prepared by partial co-hydrolysis and polycondensation of the functional group-containing silane compound represented by Formula 1 and the tetraalkoxysilane. In this case, the alkoxysilyl or phenoxysilyl groups as —$OR^1$ or —$OR^2$ bonded to the silicon atom may be partially hydrolyzed to form a silanol group. The alkoxysilyl groups of the tetraalkoxysilane may be partially hydrolyzed to form a silanol group. Condensation of the two silanol groups may be used to give the oligomeric silane coupling agent. The use of the oligomer is preferred due to its tendency to keep the adhesive composition from flying away during coating and drying.

Combinations of the monomers usable for the preparation of the oligomeric silane coupling agent are, for example, as follows.

As mercaptomethyl group-containing cooligomers, there can be exemplified mercaptomethyltrimethoxysilane-tetramethoxysilane, mercaptomethyltrimethoxysilane-tetraethoxysilane, mercaptomethyltriethoxysilane-tetramethoxysilane, and mercaptomethyltriethoxysilane-tetraethoxysilane cooligomers.

As mercaptopropyl group-containing cooligomers, there can be exemplified 3-mercaptopropyltrimethoxysilane-tetramethoxysilane, 3-mercaptopropyltrimethoxysilane-tetraethoxysilane, 3-mercaptopropyltriethoxysilane-tetramethoxysilane, and 3-mercaptopropyltriethoxysilane-tetraethoxysilane cooligomers.

As glycidoxymethyl group-containing cooligomers, there can be exemplified glycidoxymethyltrimethoxysilane-tetramethoxysilane, glycidoxymethyltrimethoxysilane-tetraethoxysilane, glycidoxymethyltriethoxysilane-tetramethoxysilane, and glycidoxymethyltriethoxysilane-tetraethoxysilane cooligomers.

As glycidoxypropyl group-containing cooligomers, there can be exemplified 3-glycidoxypropyltrimethoxysilane-tetramethoxysilane, 3-glycidoxypropyltrimethoxysilane-tetraethoxysilane, 3-glycidoxypropyltriethoxysilane-tetramethoxysilane, and 3-glycidoxypropyltriethoxysilane-tetraethoxysilane cooligomers.

As methacryloyloxypropyl group-containing cooligomers, there can be exemplified acryloyloxypropyl group-containing cooligomers, such as 3-acryloyloxypropyltrimethoxysilane-tetramethoxysilane, 3-acryloyloxypropyltrimethoxysilane-tetraethoxysilane, 3-acryloyloxypropyltriethoxysilane-tetramethoxysilane, 3-acryloyloxypropyltriethoxysilane-tetraethoxysilane, 3-acryloyloxypropylmethyldimethoxysilane-tetramethoxysilane, 3-acryloyloxypropylmethyldimethoxysilane-tetraethoxysilane, 3-acryloyloxypropylmethyldiethoxysilane-tetramethoxysilane and 3-acryloyloxypropylmethyldiethoxysilane-tetraethoxysilane cooligomers, 3-methacryloyloxypropyltrimethoxysilane-tetramethoxysilane, 3-methacryloyloxypropyltrimethoxysilane-tetraethoxysilane, 3-methacryloyloxypropyltriethoxysilane-tetramethoxysilane, 3-methacryloyloxypropyltriethoxysilane-tetraethoxysilane, 3-methacryloyloxypropylmethyldimethoxysilane-tetramethoxysilane, 3-methacryloyloxypropylmethyldimethoxysilane-tetraethoxysilane, 3-methacryloyloxypropylmethyldiethoxysilane-tetramethoxysilane, and 3-methacryloyloxypropylmethyldiethoxysilane-tetraethoxysilane cooligomers.

The oligomeric silane coupling agent may be obtained by synthesis or from commercially available products. As commercially available products of the oligomeric silane coupling agent, there are, for example, X-41-1805, X-41-1810, X-41-1053, and X-41-1058, all of which are trade names of Shin-Etsu Chemical Co. Ltd. X-41-1805 is a silicon oligomer having mercapto, methoxy, and ethoxy groups. X-41-1810 is a silicon oligomer having mercapto, methyl, and methoxy groups. X-41-1053 is a silicon oligomer having epoxy, methoxy, and ethoxy groups. X-41-1058 is a silicon oligomer having epoxy, methyl, and methoxy groups.

The oligomeric silane coupling agent may be included in an amount of about 0.02 to about 1 part by weight, based on about 100 parts by weight of the (meth)acrylic copolymer. Maintaining the amount of oligomeric silane coupling agent at about 0.02 parts by weight or more helps ensure that low tack of the adhesive composition is effectively obtained. Maintaining the amount of oligomeric silane coupling agent at about 1 part by weight or less helps ensure that the durability of the adhesive composition is not deteriorated. The amount of oligomeric silane coupling agent is preferably from about 0.03 to about 0.9 parts by weight, and more preferably about 0.05 to about 0.8 parts by weight.

[Isocyanate Curing Agent]

The adhesive composition may include an isocyanate curing agent. The isocyanate curing agent may be used in addition to the carbodiimide curing agent. The carbodiimide curing agent may serve as a main component for forming the cross-linked structure, and the isocyanate curing agent may service as an assistant component. When the isocyanate curing agent is added, the adhesive layer may exhibit improved crosslinking properties and adhesion to a film.

Examples of the isocyanate curing agent may include aromatic diisocyanates, such as triallyl isocyanate, dimeric acid diisocyanate, 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), toluidine diisocyanate (TODI), and 1,5-naphthalene diisocyanate (NDI); aliphatic diisocyanates, such as hexamethylene diisocyanate (HDI), trimethylhexamethylene diisocyanate (TM-HDI), lysine diisocyanate, and norbornane diisocyanate methyl (NBDI); alicyclic isocyanates, such as trans-cyclohexane-1,4-diisocyanate, isophorone diisocyanate (IPDI), H6-XDI (hydrogen added XDI), and H12-MDI (hydrogen added MDI); carbodiimide-modified diisocyanates of the foregoing diisocyanates; isocyanurate-modified diisocyanates thereof; etc. In addition, adducts of the foregoing isocyanate compounds and polyol compounds, such as trimethylolpropane, or biurets and isocyanurates of the isocyanate compounds may be used.

The isocyanate curing agent may be obtained by synthesis or from commercially available products. Commercially available products of the isocyanate curing agent may include Coronate® L, Coronate® HL, Coronate® 2030, Coronate® 2031 (all available from Nippon Polyurethane Industry Co., Ltd.); Takenate® D-102, Takenate® D-110N, Takenate® D-200, Takenate® D-202 (all available from Mitsui Chemicals Inc.); Duranate™ 24A-100, Duranate™ TPA-100, Duranate™ TKA-100, Duranate™ P301-75E, Duranate™ E402-90T, Duranate™ E405-80T, Duranate™ TSE-100, Duranate™ D-101, and Duranate™ D-201 (all available from Asahi Kasei Corporation); and the like.

Specifically, Coronate® L, Coronate® HL, Takenate® D-110N, and Duranate™ 24A-100 are preferable; Coronate® L and Takenate® D-110N are more preferable; and Coronate® L is still more preferable. These curing agents may be used alone or in a combination thereof.

When the isocyanate curing agent is used, the isocyanate curing agent may be present in an amount of about 0.05 to about 5 parts by weight, based on 100 parts by weight of the (meth)acrylic copolymer. Within this range, it is possible to achieve easy adjustment of the degree of cross-linking together with the carbodiimide. Specifically, the amount of isocyanate curing agent may be about 0.1 to about 3 parts by weight, preferably about 0.1 to about 2.6 parts by weight.

[Other Additives]

In an example embodiment, the adhesive composition may further include one or more additives. Examples of the additives include a curing accelerator, an inorganic filler, a softener, an antioxidant, an anti-aging agent, a stabilizer, a tackifier resin, a reforming resin (polyol resin, phenolic resin, acrylic resin, polyester resin, polyolefin resin, epoxy resin, epoxylated poly-butadiene resin, etc.), a leveling agent, an antifoaming agent, a plasticizer, a dye, a pigment (coloring and extender pigments), a treatment agent, a viscosity control agent, a fluorescent whitening agent, a dispersant, a light stabilizer, an anti-static agent, lubricant, and a solvent.

Examples of the curing accelerator may include dibutyltin dilaurate, JCS-50 (Johoku Chemical Company Ltd.), and Formate TK-1 (Mitsui Chemicals Inc.).

Examples of the antioxidant may include dibutylhydroxytoluene (BHT), Irganox® 1010, Irganox® 1035FF, and Irganox® 565 (all available from BASF Japan Co., Ltd.).

Examples of the tackifier resin may include rosins, such as rosin acid, polymerized rosin acid, and rosin acid ester, a terpene resin, a terpene phenolic resin, an aromatic hydrocarbon resin, an aliphatic saturated hydrocarbon resin, and a petroleum resin.

If the adhesive composition contains these additives, the amount of additives is not specifically limited but may be in the range of about 0.1 to about 20 parts by weight based on about 100 parts by weight of the (meth)acrylic copolymer.

[Preparation Method]

The adhesive composition according to an example embodiment may be prepared by stirring and mixing the (meth)acrylate copolymer, the carbodiimide curing agent, the oligomeric silane coupling agent, and the isocyanate curing agent or other additives as desired. In particular, if the (meth)acrylate copolymer is prepared by solution polymerization, the (meth)acrylate copolymer may be used in a liquid phase in preparation of the adhesive composition without isolation and purification of the (meth)acrylate copolymer.

The adhesive composition may be prepared by mixing the above components at once or in order, or mixing a plurality of random components first and then adding the remaining components, and stirring the components into a uniform mixture. The adhesive composition may be prepared by heating the components to about 30 to about 40° C., as suits the particular components, and stirring using a stirrer for about 10 minutes to about 5 hours until the mixture is uniform.

[Adhesive Layer and Optical Member]

The adhesive composition may be used to bond various materials, for example glass, plastic films, paper, metal foil, and the like. The glass may include general inorganic glass. Plastics of the plastic films may include polyvinyl chloride resin, polyvinylidene chloride, cellulose resins, acrylic resins, cycloolefin resins, amorphous polyolefin resins, polyethylene, polypropylene, polystyrene, ABS resin, polyamide, polyester, polycarbonate, polyurethane, polyvinyl alcohol, an ethylene-vinyl acetate copolymer, and chlorinated polypropylene. The amorphous polyolefin resins include a polymer unit of a cyclic polyolefin, such as norbornene or multiple-ring norbornene monomers, and may be a copolymer of cyclic olefin and a chain-cyclic olefin. Commercially available products of amorphous polyolefin resins include ATON™ (JSR Co., Ltd.), ZEONEX® and ZEONR® (Nihon Zeon Co., Ltd.), APO® and APEL® (Mitsui Chemicals Inc.), etc. The amorphous polyolefin resins may be formed into a film by a suitable method, such as solvent casting and melt extrusion. Further, examples of paper may include vellum paper, wood free paper, kraft paper, art coat paper, caster coat paper, bowl paper, artificial parchment, waterproof paper, glassine paper, and linerboard. Examples of metal foil may include aluminum foil.

Another embodiment provides an optical member including an adhesive layer formed of the adhesive composition according to an embodiment.

Examples of the optical member may include a polarizer plate, a phase difference plate, an optical film for PDPs, a conductive film for touch panels, and the like. Among these optical members, the adhesive composition of the invention has excellent adhesion to a polarizer plate and glass. As described above, the adhesive layer of the adhesive composition may provide suitable flexibility and durability, thereby advantageously preventing peeling or separation of the polarizer plate and foaming of the adhesive layer under high temperature/high humidity conditions. Furthermore, the adhesive composition according to an embodiment may exhibit has low tack. Thus, the adhesive composition may be advantageously used for bonding of a film to a liquid crystal panel. The film may be easily separated from a large liquid crystal panel. Thus, the film may be reused without damaging the liquid crystal panel, thereby improving workability and productivity. It will be understood that the adhesive composition according to an embodiment may be used to bond other materials.

The adhesive composition according to an embodiment may be applied directly to one or opposite sides of an optical member, thereby forming an adhesive layer. Alternatively, an adhesive layer, formed in advance by depositing the adhesive composition on a release film, may be transferred to one or opposite sides of an optical member.

The adhesive composition may be coated by any suitable method, e.g., various methods using a natural coater, a knife belt coater, a floating knife, knife-over-roll coating, knife-on-blanket coating, spraying, dipping, kiss-roll coating, squeeze-roll coating, reverse-roll coating, an air blade, a curtain flow coater, a doctor blade, a wire bar, a die coater, a comma coater, a baker applicator, and a gravure coater. Although it may be adjusted based on materials and purposes, the thickness of the coated adhesive composition (thickness after drying) may be about 5 to about 30 μm, preferably about 15 to about 25 μm.

The adhesive composition may use the (meth)acrylic copolymer having a low molecular weight as described above. Thus, it may be possible to increase the solid content in an adhesive composition solution for coating and to enhance productivity of products including the adhesive layer. As described in detail with reference to examples described below, the (meth)acrylic copolymer may be obtained in a state that a solvent is included therein, and may be directly used in preparation of the adhesive composition. Thus, a solid content in a prepared (meth)acrylic copolymer solution may represent the solid content and viscosity of the adhesive composition solution for application. The (meth)acrylic copolymer preferably has a solid content of about 10 to about 45 wt %, more preferably about 12 to about 40 wt %, and still more preferably about 13.0 to about 30.0 wt %. The (meth)acrylic copolymer solution may have a viscosity about 1.0 to about 20 Pa·s at 25° C., preferably about 2.5 to about 12.0 Pa·s, and more preferably about 2.8 to about 8.0 mPa·s, in order to facilitate coating of the adhesive composition and control of the thickness of the adhesive layer formed of the adhesive composition. Further, the solid content and viscosity may be measured by the process described in the following examples.

An adhesive layer obtained from the adhesive composition according to an embodiment may be formed by cross-linking the adhesive composition described above. Cross-linking of the adhesive composition may be generally performed after applying the adhesive composition. In another implementation, an adhesive layer formed of the cross-linked adhesive composition may be transferred to a substrate. The adhesive composition may be cross-linked at about 20 to about 40° C., about 30 to about 70% RH, and normal (atmospheric) pressure by storage for about 3 to about 7 days.

EXAMPLES

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

The solid content and viscosity of the adhesive composition solutions obtained in Examples and Comparative Examples were measured by the following process.

<Solid Content>

About 1 g of a polymer solution was precisely measured on a precisely weighed glass plate. The solution was dried at 105° C. for 1 hour and cooled to room temperature, and then the total mass of the glass plate and the remaining solid content were precisely measured. Defining the mass of the glass plate as X, the total mass of the glass plate and the polymer solution before drying as Y, and the total mass of the glass plate and the remaining solid content as Z, a solid content was calculated by Equation 1:

[Equation 1]

$$\text{Solid content (\%)} = \{(Z-X)/(Y-X)\} \times 100 \qquad \text{[Equation 1]}$$

<Viscosity>

The temperature of a polymer solution in a glass bottle was adjusted to 25° C. and the viscosity of the polymer solution was measured using a viscometer DV-II+Pro (Spindle No. 63, 12 rpm, Brookfield Co., Ltd.).

Example 1

98 parts by weight of n-butyl acrylate (Nihon Shokubai, Co., Ltd.), 2 parts by weight of acrylic acid (Nihon Shokubai, Co., Ltd.), and 150 parts by weight of ethyl acetate were placed in a flask equipped with a reflux condenser and an agitator, and were heated to 65° C. under nitrogen atmosphere. Then, 0.1 parts by weight of azobisisobutyronitrile (AIBN) was added to the mixture, followed by polymerization for 6 hours while maintaining the mixture at 65° C. After completing polymerization, the mixture was diluted with 83 parts by weight of ethyl acetate, thereby obtaining a solution of an acrylic copolymer. The prepared acrylic copolymer solution had a solid content of 28.0 wt % and a viscosity of 5.0 Pa·s. Further, the acrylic copolymer had a weight average molecular weight of 600,000 g/mol.

To the prepared acrylic copolymer solution, 0.3 parts by weight of CARBODILITE® V-07 (Nisshinbo Chemical Inc.) as a carbodiimide curing agent, 0.3 parts by weight of X-41-1053 (Shin-Etsu Chemical Co., Ltd.) as an oligomeric silane coupling agent, and 0.3 parts by weight of CORONATE® L (trimethylolpropane/tolylene diisocyanate trimer adduct, Nippon Polyurethane Industry Co., Ltd.) as an isocyanate curing agent were mixed at room temperature (25° C.) for 10 minutes, thereby producing an adhesive composition solution.

The solution was applied to a PET release film (MRF38, thickness: 38 μm, Mitsubishi Polyester Film Inc.) to a dry thickness of 25 μM. Then, the solution applied to the release film was dried at 90° C. for 3 minutes, thereby forming an adhesive composition layer on the film. Then, the adhesive composition layer on the PET release film was attached to a polarizer plate.

Then, the polarizer plate having the adhesive composition layer was left at 23° C. and 50% RH for 7 days for cross-linking of the adhesive composition, thereby providing an adhesive layer-attached polarizer plate. Durability and adhesive strength of the adhesive layer-attached polarizer plate were evaluated by the following testing. The evaluation results are shown together with compositions in for the Examples and Comparative Examples in Tables 2-6.

In Tables 2-6, "BA" indicates butyl acrylate, "MA" indicates methyl acrylate, "AA" indicates acrylic acid, "2HEA" indicates 2-hydroxyethyl acrylate, "#1053" and "#1810" respectively indicate X-41-1053 and X-41-1810 (which are oligomeric silane coupling agent products of Shin-Etsu Chemical Co., Ltd.), "C-L" indicates CORONATE® L (isocyanate curing agent, Nippon Polyurethane Industry Co., Ltd.), "TAZM" indicates trimethylolpropane tri-β-aziridinyl-propionate, and "KBM-403" is a product name of a monomeric silane coupling agent obtained from Shin-Etsu Chemical Co., Ltd.

<Heat Resistance>

Each adhesive layer-attached polarizer plate was cut into a 120 mm (MD direction of the polarizer plate)×60 mm piece and attached to a glass substrate (Eagle 2000, thickness: 0.7 mm, Corning Japan Co., Ltd.). The sample was autoclaved at 50° C. and 0.49 MPa (5 kg/cm$^2$) for 20 minutes. Then, the sample was left at 80° C. for 120 hours, followed by observation of appearance with the naked eye. In Tables 2-6, no appearance of bubbles, separation, or peeling is indicated by "O", while appearance of bubbles, separation, or peeling is indicated by "X".

<Humid Heat Resistance>

Each adhesive layer-attached polarizer plate was cut into a 120 mm (MD direction of the polarizer plate)×60 mm piece and attached to a glass substrate (Eagle 2000, thickness: 0.7 mm, Corning Japan Co., Ltd.). The sample was autoclaved at 50° C. and 0.49 MPa (5 kg/cm$^2$) for 20 minutes. Then, the sample was left at 60° C., 90% RH for 120 hours, followed by observation of appearance with the naked eye. In Tables 2-6, no appearance of bubbles, separation, or peeling is indicated by "O", appearance of slight bubbles, separation or peeling is indicated by "Δ", and appearance of bubbles, separation, or peeling is indicated by "X".

<Light Leakage Resistance>

Each adhesive layer-attached polarizer plate was cut into a 120 mm (MD direction of the polarizer plate)×60 mm piece and a 120 mm×600 mm (TD direction of the polarizer plate) piece. The respective pieces were attached to opposite sides of a glass substrate (Eagle 2000, thickness: 0.7 mm, Corning Japan Co., Ltd.) to overlap with each other. Then, the glass substrate was left at 80° C. for 120 hours and 500 hours, followed by observation of appearance with the naked eye. In Tables 2-6, evaluation results are as follows: Δ: Very good (no light leakage), O: Good (substantially no light leakage), X: Defect (Light leakage).

<Adhesive Strength>

Each adhesive layer-attached polarizer plate was cut into 25 mm wide pieces. Then, the pieces were attached to a glass substrate (Eagle 2000, thickness: 0.7 mm, Corning Japan Co., Ltd.) and autoclaved at 50° C. and 0.49 MPa (5 kg/cm$^2$) for 20 minutes. The adhesive strength of the adhesive layer was measured according to a testing method of adhesive tapes and sheets disclosed in JIS Z0237 (2000) using a tensile tester at a peeling angle of 90° and a peeling rate of 0.3 m/min under 23° C./50% RH conditions. While measuring the adhesive strength, the separated state of the glass substrate was evaluated. In Tables 2-6, when the glass substrate had no contamination caused by the adhesive layer, it is represented by "O", and when the glass substrate had contamination caused by the adhesive layer, it is represented by "X."

Example 2

98 parts by weight of n-butyl acrylate (Nihon Shokubai, Co., Ltd.), 2 parts by weight of acrylic acid (Nihon Shokubai, Co., Ltd.), and 125 parts by weight of ethyl acetate were placed in a flask equipped with a reflux condenser and an agitator, and were heated to 65° C. under nitrogen atmosphere. Then, 0.05 parts by weight of azobisisobutyronitrile (AIBN) was added to the mixture, followed by polymerization for 6 hours while maintaining the mixture at 65° C. After completing polymerization, the mixture was diluted with 275 parts by weight of ethyl acetate, thereby obtaining a solution of an acrylic copolymer. The prepared acrylic copolymer solution had a solid content of 18.0 wt % and a viscosity of 7.0 Pa·s. Further, the acrylic copolymer had a weight average molecular weight of 1,200,000 g/mol.

As in Example 1, this solution and components in a ratio shown in Table 2 were used to prepare an adhesive layer-attached polarizer plate, which in turn was subjected to evaluation of durability and adhesive strength. Results are shown in Table 2.

Example 3

98 parts by weight of n-butyl acrylate (Nihon Shokubai, Co., Ltd.), 2 parts by weight of acrylic acid (Nihon Shokubai, Co., Ltd.), and 115 parts by weight of ethyl acetate were placed in a flask equipped with a reflux condenser and an agitator, and were heated to 65° C. under nitrogen atmosphere. Then, 0.04 parts by weight of azobisisobutyronitrile (AIBN) was added to the mixture, followed by polymerization for 6 hours while maintaining the mixture at 65° C. After completing polymerization, the mixture was diluted with 285 parts by weight of ethyl acetate, thereby obtaining a solution of an acrylic copolymer. The prepared acrylic copolymer solution had a solid content of 15.0 wt % and a viscosity of 6.0 Pa·s. Further, the acrylic copolymer had a weight average molecular weight of 1,600,000 g/mol.

As in Example 1, this solution and components in a ratio shown in Table 2 were used to prepare an adhesive layer-attached polarizer plate, which in turn was subjected to evaluation of durability and adhesive strength. Results are shown in Table 2.

Example 4

98 parts by weight of n-butyl acrylate (Nihon Shokubai, Co., Ltd.), 2 parts by weight of acrylic acid (Nihon Shokubai, Co., Ltd.), and 100 parts by weight of ethyl acetate were placed in a flask equipped with a reflux condenser and an agitator, and were heated to 65° C. under nitrogen atmosphere. Then, 0.04 parts by weight of azobisisobutyronitrile (AIBN) was added to the mixture, followed by polymerization for 6 hours while maintaining the mixture at 65° C. After completing polymerization, the mixture was diluted with 300 parts by weight of ethyl acetate, thereby obtaining a solution of an acrylic copolymer. The prepared acrylic copolymer solution had a solid content of 13.0 wt % and a viscosity of 5.0 Pa·s. Further, the acrylic copolymer had a weight average molecular weight of 1,800,000 g/mol.

As in Example 1, this solution and components in a ratio shown in Table 2 were used to prepare an adhesive layer-attached polarizer plate, which in turn was subjected to evaluation of durability and adhesive strength. Results are shown in Table 2.

Examples 5 to 16

In preparation of adhesive compositions and adhesive layer-attached polarizer plates, Example 5 was prepared by the same process as in Example 1, Examples 6 to 8 and 11 to 16 were prepared by the same process as in Example 2, and Examples 9 and 10 were prepared by the same process as in Example 3, except for compositions listed in Tables 2 to 4. The properties of the prepared adhesive compositions and the adhesive layer-attached polarizer plates were evaluated. Tables 2-4 show the evaluation results together with materials, ratio, and properties.

Example 17

97.9 parts by weight of n-butyl acrylate (Nihon Shokubai, Co., Ltd.), 2 parts by weight of acrylic acid (Nihon Shokubai, Co., Ltd.), and 0.1 parts by weight of 2-hydroxyethyl acrylate and 140 parts by weight of ethyl acetate were placed in a flask equipped with a reflux condenser and an agitator, and were heated to 65° C. under nitrogen atmosphere. Then, 0.1 parts by weight of azobisisobutyronitrile (AIBN) was added to the mixture, followed by polymerization for 6 hours while maintaining the mixture at 65° C. After completing polymerization, the mixture was diluted with 160 parts by weight of ethyl acetate, thereby obtaining a solution of an acrylic copolymer. The prepared acrylic copolymer solution had a solid content of 23.0 wt % and a viscosity of 8.0 Pa·s. Further, the acrylic copolymer had a weight average molecular weight of 1,000,000 g/mol.

As in Example 1, this solution and components in a ratio shown in Table 4 were used to prepare an adhesive layer-attached polarizer plate, which in turn was subjected to evaluation of durability and adhesive strength. Results are shown in Table 4.

Example 18

97.9 parts by weight of n-butyl acrylate (Nihon Shokubai, Co., Ltd.), 2 parts by weight of acrylic acid (Nihon Shokubai, Co., Ltd.), and 0.1 parts by weight of 2-hydroxyethyl acrylate and 160 parts by weight of ethyl acetate were placed in a flask equipped with a reflux condenser and an agitator, and were heated to 65° C. under nitrogen atmosphere. Then, 0.1 parts by weight of azobisisobutyronitrile (AIBN) was added to the mixture, followed by polymerization for 6 hours while maintaining the mixture at 65° C. After completing polymerization, the mixture was diluted with 140 parts by weight of ethyl acetate, thereby obtaining a solution of an acrylic copolymer. The prepared acrylic copolymer solution had a solid content of 22.8 wt % and a viscosity of 2.8 Pa·s. Further, the acrylic copolymer had a weight average molecular weight of 800,000 g/mol.

As in Example 1, this solution and components in a ratio shown in Table 4 were used to prepare an adhesive layer-attached polarizer plate, which in turn was subjected to evaluation of durability and adhesive strength. Results are shown in Table 4.

Comparative Examples 1 to 10

In preparation of adhesive compositions and adhesive layer-attached polarizer plates, Comparative Example 1 was prepared by the same process as in Example 1, Comparative Examples 2, 4, 5 and 7 to 10 were prepared by the same process as in Example 2, and Comparative Examples 3 and 6 were prepared by the same process as in Example 3, except for using the compositions listed in Tables 5 and 6. The properties of the prepared adhesive compositions and the adhesive layer-attached polarizer plates were evaluated. Tables 5 and 6 show the evaluation results together with materials, ratio, and properties.

From Tables 2 to 6, the following results were obtained. In Examples 1 to 13 and 15 to 18, the adhesive compositions realized good durability and low tack. In particular, the adhesive compositions had a weight average molecular weight of 1,200,000 g/mol to 1,600,000 g/mol, and the adhesive composition containing 2 parts by weight of the carboxyl group-containing monomer had excellent durability compatible with low tack. Without being bound by theory, it is believed that, when the adhesive composition is applied to the substrate, stains are unlikely to be formed on the substrate, and the adhesive composition forms a more uniform adhesive layer and has the degree of crosslinking capable of preventing stress concentration caused by a dimensional change of the polarizer plate.

In Comparative Examples 1 and 2, wherein the adhesive composition was prepared using aziridine instead of the carbodiimide curing agent, desirable levels of durability and low tack were not obtained. It is considered that, since aziridine provides a branched cross-linked structure, the adhesive layer had insufficient flexibility to deal with deformation of the polarizer plate, thereby causing insufficient durability.

Further, in Comparative Example 3 wherein the adhesive composition was prepared using a monomeric silane coupling agent instead of an oligomeric silane coupling agent, the adhesive composition had good durability but exhibited high adhesion, thereby failing to provide low tack. In Comparative Examples 4 and 5 (wherein the adhesive compositions were prepared using the carbodiimide curing agent at the stated amounts) and Comparative Example 7 (wherein the adhesive compositions were prepared without using the carbodiimide curing agent), the adhesive compositions exhibited low tack, but had insufficient durability. In Comparative Examples 6 and 9 (wherein the adhesive compositions were prepared using the oligomeric silane coupling agent at the stated amounts) and Comparative Example 8 (wherein the adhesive composition was prepared without using the oligomeric silane coupling agent), the adhesive compositions exhibited low tack, but had poor durability. In Comparative Example 10 (wherein the content of carbodiimide curing agent and the content of oligomeric silane coupling agent were at the stated amounts), the adhesive composition had poor durability.

As can be seen from the above Examples and Comparative Examples, example embodiments may enable compatibility between good durability and low tack.

By way of summation and review, in LCD manufacturing, respective members, e.g., an LCD panel, a polarizer plate, a protective film, and the like, may be adjusted in arrangement in positioning. In some cases, it may be desirable to separate such stacked members from each other and then attach (bond) them to each other again. In a process of separating a bonded member of the display apparatus (for example, a bonded polarizer plate) from the LCD panel, greater force is generally required as the size of the display apparatus increases. Thus, there is a possibility of decreasing productivity and workability. Further, gaps between cells of the LCD panel can be changed depending on stress applied when a bonded member is detached. An adhesive should provide reworkability such that the adhesive does not remain after detachment, and should provide lower tack in order to allow the respective members to be easily separated from each other even in a large scale display apparatus.

Generally, in an adhesive composition that includes an aziridine compound, the aziridine compound may be toxic and harmful to the human body, which is detrimental to workability and safety. Moreover, an adhesive composition that includes an acrylic resin, an isocyanate compound, an aziridine compound, and a silicone oligomer may not provide a suitably low tack.

An optical film such as a polarizer plate used for an image display apparatus may undergo substantial dimensional change due to change of environment. Further, when an adhesive such as a label or a double-sided tape is used, foaming or peeling may occur under high-temperature and high-humidity conditions. It may be possible to increase the molecular weight of a resin as a main component of an adhesive, in order to enhance durability. However, a resin having a high molecular weight may result in a reduced solid content in the adhesive solution, causing deterioration in productivity of the adhesive composition.

In an effort to improve durability, an adhesive agent may be mixed with a silane coupling agent. However, addition of the silane coupling agent may cause adhesion to a glass substrate to be too strong, so that low tack cannot be realized. In contrast, as described above in connection with example embodiments, an adhesive composition according to an embodiment may provide low tack compatible with durability. As described above, low tack of the adhesive composition according to an embodiment may enhance workability and productivity for large scale display apparatuses. As the adhesive composition has low tack, reworkability may also be provided. Further, enhanced durability of the adhesive composition may prevent peeling of an optical film under high-temperature and high-humidity conditions, thereby improving product reliability and durability with respect to heat resistance, humidity resistance, and light leakage resistance.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. For example, the (meth)acrylic copolymer may be used alone or in a combination of at least two polymers. Accordingly, it will be understood by those of skill in the art that various changes in form and details may be made without departing from the spirit and scope of the present invention as set forth in the following claims.

What is claimed is:

1. An adhesive composition, comprising:
    a (meth)acrylic copolymer, said (meth)acrylic copolymer containing about 92 to about 99.7 parts by weight of a moiety derived from a (meth)acrylic acid ester monomer, and about 0.3 to about 8 parts by weight of at least one of a moiety derived from a carboxyl group-containing monomer and a moiety derived from a hydroxyl group-containing (meth)acrylic acid monomer, said (meth)acrylic copolymer having a weight average molecular weight of about 500,000 g/mol to about 2,000,000 g/mol;
    a carbodiimide curing agent; and
    an oligomeric silane coupling agent.

2. The adhesive composition as claimed in claim 1, wherein said adhesive composition comprises:
    about 100 parts by weight of said (meth)acrylic copolymer,
    about 0.01 to about 1.0 part by weight of said carbodiimide curing agent, and
    about 0.02 to about 1.0 part by weight of said oligomeric silane coupling agent.

3. The adhesive composition as claimed in claim 1, further comprising an isocyanate curing agent.

4. The adhesive composition as claimed in claim 3, wherein said isocyanate curing agent is present in an amount of about 0.05 to about 5 parts by weight, based on 100 parts by weight of the (meth)acrylic copolymer.

5. The adhesive composition as claimed in claim 1, wherein said (meth)acrylic copolymer has a weight average molecular weight of about 600,000 g/mol to about 1,800,000 g/mol.

6. The adhesive composition as claimed in claim 1, wherein said oligomeric silane coupling agent has an organic functional group.

7. The adhesive composition as claimed in claim 6, wherein said adhesive composition has an adhesive strength of about 0.5 to about 5.0 N/25 mm at a peeling angle of 90 degrees and at a peeling rate of 0.3 m/min.

8. The adhesive composition as claimed in claim 6, wherein said organic functional group is at least one of a vinyl group, an epoxy group, a styryl group, a (meth)acryloyl, a methacryloxy group, an acryloxy group, an amino group, a ureido group, a chloropropyl group, a mercapto group, and a polysulfide group.

9. The adhesive composition as claimed in claim 8, wherein said (meth)acrylic acid ester monomer is selected from methyl (meth)acrylate, ethyl (meth)acrylate, n-butyl (meth)acrylate, 2-ethylhexyl (meth)acrylate, and combinations thereof.

10. The adhesive composition as claimed in claim 9, wherein said (meth)acrylic copolymer includes said moiety derived from a carboxyl group-containing monomer, and said carboxyl group-containing monomer is selected from (meth)acrylic acid, maleic acid, maleic anhydride, fumaric acid, fumaric anhydride, crotonic acid, itaconic acid, itaconic anhydride, and combinations thereof.

11. The adhesive composition as claimed in claim 10, wherein said (meth)acrylic copolymer includes said moiety derived from a hydroxyl group-containing (meth)acrylic acid monomer, and said hydroxyl group-containing (meth)acrylic acid monomer is selected from 2-hydroxyethyl (meth)acrylate, 4-hydroxybutyl (meth)acrylate, 2-hydroxyethyl (meth)acrylamide, cyclohexane dimethanol monoacrylate, and combinations thereof.

12. An optical member comprising an adhesive layer formed of the adhesive composition as claimed in claim 1.

* * * * *